United States Patent
Jechoux

(10) Patent No.: US 8,184,535 B2
(45) Date of Patent: May 22, 2012

(54) FLOW CONTROL TECHNIQUES FOR CO-LOCALIZED WLAN AND BLUETOOTH

(75) Inventor: Bruno Jechoux, Sophia-Antipolis (FR)

(73) Assignee: Wipro Limited, Bangalore, Karnataka (IN)

( * ) Notice: Subject to any disclaimer, the term of this patent is extended or adjusted under 35 U.S.C. 154(b) by 700 days.

(21) Appl. No.: 12/177,895

(22) Filed: Jul. 23, 2008

(65) Prior Publication Data

US 2010/0020773 A1  Jan. 28, 2010

(51) Int. Cl.
*H04L 12/26* (2006.01)

(52) U.S. Cl. ........ 370/231; 370/236; 370/338; 370/340; 370/461; 709/225; 709/229; 455/41.2; 455/448

(58) Field of Classification Search ....... 370/229–236.2, 370/310, 311, 322, 329, 338, 340, 341, 348, 370/395.4, 461; 709/208, 225, 226, 227, 709/229; 455/41.2, 448, 450, 452.2, 509, 455/574
See application file for complete search history.

(56) References Cited

U.S. PATENT DOCUMENTS

| | | | |
|---|---|---|---|
| 7,406,296 B2 * | 7/2008 | Haartsen | 455/41.2 |
| 7,899,396 B2 * | 3/2011 | Meylan et al. | 455/41.2 |
| 2002/0136183 A1 * | 9/2002 | Chen et al. | 370/338 |
| 2004/0259542 A1 * | 12/2004 | Viitamaki et al. | 455/41.2 |
| 2005/0059347 A1 * | 3/2005 | Haartsen | 455/41.2 |
| 2005/0122927 A1 * | 6/2005 | Wentink | 370/311 |
| 2005/0136933 A1 * | 6/2005 | Sandhu et al. | 455/450 |
| 2006/0239223 A1 * | 10/2006 | Sherman et al. | 370/329 |
| 2006/0274704 A1 | 12/2006 | Desai et al. | |
| 2006/0292986 A1 * | 12/2006 | Bitran et al. | 455/41.2 |
| 2006/0292987 A1 | 12/2006 | Ophir et al. | |
| 2007/0066227 A1 | 3/2007 | Duerdodt et al. | |
| 2007/0160003 A1 * | 7/2007 | Meier | 370/329 |
| 2007/0281617 A1 | 12/2007 | Meylan et al. | |
| 2008/0259837 A1 * | 10/2008 | Thoukydides | 370/311 |
| 2009/0116437 A1 * | 5/2009 | Alexandre et al. | 370/329 |

* cited by examiner

*Primary Examiner* — Jeffrey M Rutkowski

(74) *Attorney, Agent, or Firm* — Prakash Nama; Global IP Services, PLLC

(57) ABSTRACT

Flow control techniques for co-localized wireless local area network (WLAN) and Bluetooth (BT) allowing efficient sharing of radio medium are disclosed. In one embodiment, a method includes deriving an available medium time ($T_{AV}$) for the WLAN device to communicate with a peer WLAN device based on schedule data forwarded by the BT device, transmitting a first data from the WLAN device to the peer WLAN device if the BT device becomes inactive and if the $T_{AV}$ is greater than a threshold time, and transmitting a second data from the WLAN device to the peer WLAN device if the $T_{AV}$ is less than the threshold time. The first data indicates that the WLAN device is to come out of a power save (PS) mode and the second data indicates that the WLAN device is to enter the PS mode.

17 Claims, 7 Drawing Sheets

FLOW CONTROL TECHNIQUES FOR CO-LOCALIZED WLAN AND BLUETOOTH

FIELD OF TECHNOLOGY

Embodiments of the present invention relate to the field of electronics. More particularly, embodiments of the present invention relate to wireless communication.

BACKGROUND

Both bluetooth (BT) and wireless local area network (WLAN) devices generally operate in 2.4 GHz band. Thus, BT and WLAN signals are likely to interfere onto each other when the BT and WLAN devices are co-localized, where co-localization of the devices may entail using the same antenna or being located in the same circuit board, chip, or apparatus. For example, the BT device which is in receiver mode may be blinded or saturated due to the transmission by the WLAN device. Although the receiver of the BT device is designed to receive a signal directed to the BT device, the power spilled from the WLAN device may be high enough to desensitize the receiver of the BT device due to their proximity to each other.

Several solutions are on the market to limit the interference between the BT and WLAN devices. Adaptive frequency hopping (AFH), which is one of the solutions, is a technique used by the BT device to modify its hopping pattern based on frequency bands not occupied by other devices, such as the WLAN device. The AFH aims at avoiding a subset of BT frequencies occupied by the WLAN device during the BT frequency hopping process. The BT device either discovers or is informed which band to jump during the AFH. Alternatively, hardware shutdown of the BT device and/or WLAN device can be implemented to protect ongoing reception by either device. To execute the shutdown, a signal or signals can be exchanged between the BT device and the WLAN device using their pin connections. For example, the WLAN device can be told to shut down its transmission when the BT device is in receiver mode or vice versa.

However, the AFH may not work so well when the BT device is co-localized with the WLAN device. Since the AFH works satisfactorily only when the BT device is able to determine whether the signal received by its antenna is in a frequency band which can be used for hopping, the BT device, with its receiver desensitized due to strong transmission signal from the co-localized WLAN device, may not be able to make that decision.

The hardware shutdown may not be so effective for either of the co-localized devices. For example, the WLAN device may need to send an acknowledgement signal to a peer WLAN device when it receives a packet from the peer WLAN device, during which time, if the BT device is in receiver mode, the WLAN device may be prevented from transmitting the acknowledgement signal. When the BT reception session is prolonged, the peer WLAN device would keep sending the same packet repeatedly until it gets the acknowledgement from the WLAN device. This may lead to a physical layer (PHY) rate decrease and hence longer frame duration. This also may lead to higher collision probability between signals of the BT device and the WLAN device. Moreover, if the BT reception session is maintained long enough, the peer WLAN device may drop the WLAN device from its communication link, thinking that the link has been degraded. This in turn may result in loss of data intended for the WLAN device.

SUMMARY

Flow control techniques for co-localized wireless local area network (WLAN) and bluetooth (BT) are disclosed. In one aspect, a method for controlling data flow of co-localized a WLAN device and a BT device includes deriving an available medium time for the WLAN device to communicate with a peer WLAN device based on schedule data forwarded by the BT device, transmitting a first data from the WLAN device to the peer WLAN device if the BT device becomes inactive and if the available medium time is greater than a threshold time, and transmitting a second data from the WLAN device to the peer WLAN device if the available medium time is less than the threshold time.

In another aspect, a method for controlling data flow of co-localized a WLAN device and a BT device includes deriving an available medium time for the WLAN device to communicate with a peer WLAN device based on schedule data forwarded by the BT device, transmitting a null frame to the peer WLAN device to trigger a service period if the BT device becomes inactive and if the available medium time is greater than a first threshold time, and maintaining a data flow between the WLAN device and the peer WLAN device until end of the service period (EOSP) or the available medium time is less than a second threshold time.

In yet another aspect, a method for controlling data flow of co-localized a WLAN device and a BT device includes deriving an available medium time for the WLAN device to communicate with a peer WLAN device based on schedule data forwarded by the BT device, transmitting a null frame with a spoofed physical layer convergence procedure (PLCP) preamble to the peer WLAN device if the WLAN device is active and if the available medium time is less than a threshold time, and suspending a flow of data between the WLAN device and the peer WLAN device until a time elapsed since an acknowledgement of receipt of the null frame by the peer WLAN device is greater than a next active period of the BT device.

The methods disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Flow control techniques for co-localized wireless local area network (WLAN) and bluetooth (BT) are disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
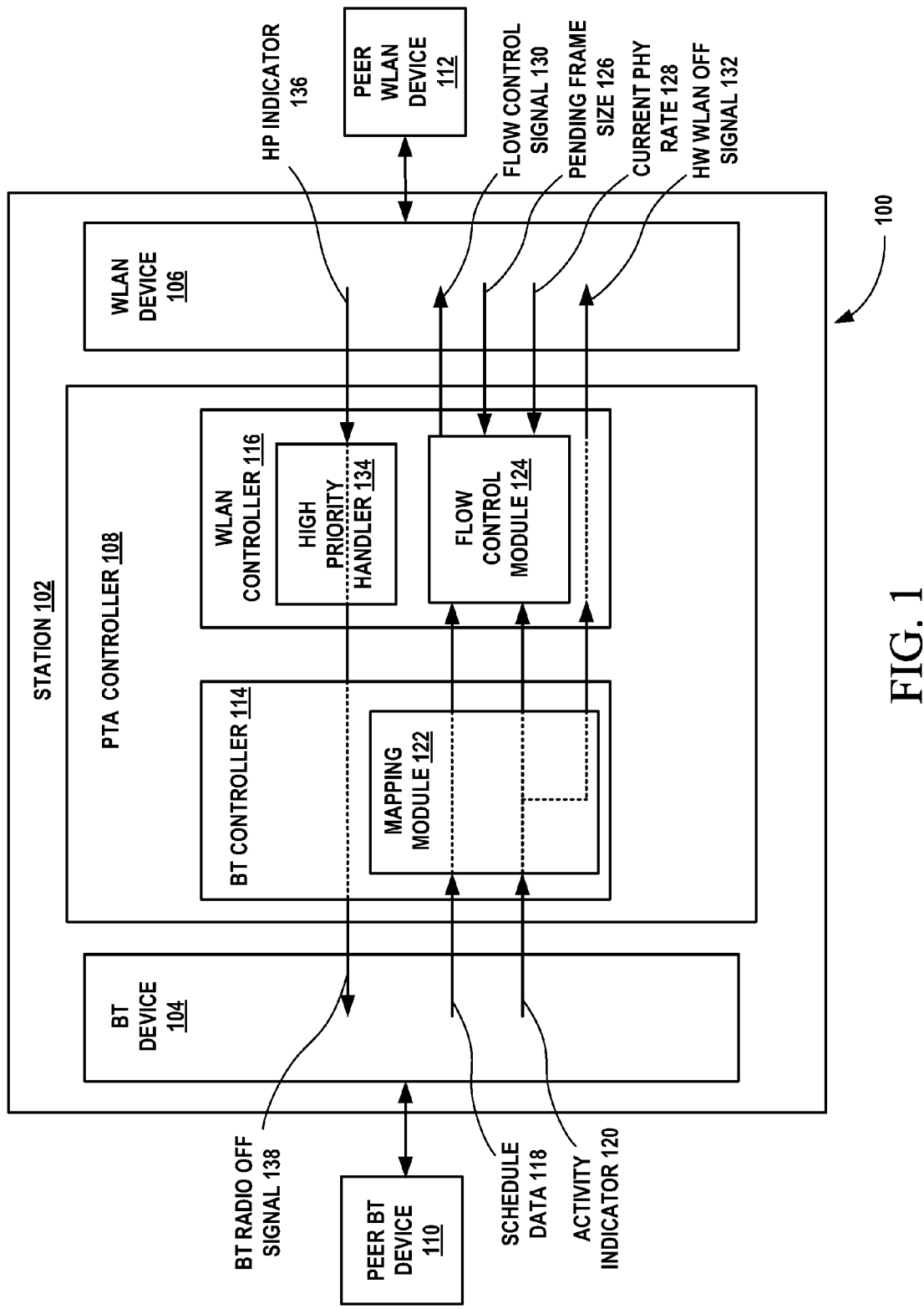
FIG. 1 is a block diagram of an exemplary station having a flow control module that controls flow of data between a WLAN device co-localized with a BT device and its peer WLAN device, according to one embodiment.

FIG. 1 is a block diagram of an exemplary station 102 having a flow control module 124 which controls a flow of data between a WLAN device 106 co-localized with a BT device 104 and its peer WLAN device 112, according to one embodiment. In one embodiment, the WLAN device 106 (e.g., that acts as a slave) and the BT device 104 (e.g., that acts as a master) are co-localized in the station 102. In one exemplary implementation, the data flow of the WLAN device 106 and the BT device 104 is controlled by a controller (e.g., a PTA controller 108) associated with the station 102. In one example embodiment, the peer WLAN device 112 may be an access point (AP).

Further as shown in FIG. 1, the PTA controller 108 includes a BT controller 114 and a WLAN controller 116. In operation, the BT device 104 provides schedule data 118 and an activity indicator 120 to the BT controller 114. For example, the schedule data 118 includes information associated with a next BT activity and the activity indicator 120 indicates a status of a current BT activity. In one embodiment, the available medium time for the WLAN device 106 to communicate with the peer WLAN device 112 is derived based on the schedule data 118 and/or the activity indicator 120.

The BT controller 114 includes a mapping module 122 to perform a single mapping of a BT activity based on the schedule data 118 provided by the BT device 104. The mapping module 122 forwards the schedule data 118 and/or the activity indicator 120 to the flow control module 124 of the WLAN controller 116. In addition, the activity indicator 120 is also provided to hardware (HW) WLAN off signal 132 when the BT device 104 becomes active. In one exemplary implementation, the flow control module 124 of the WLAN controller 116 transmits a flow control signal 130 to the WLAN device 106 to stop transmitting/receiving data associated with the WLAN device 106 (i.e., rendering the WLAN device 106 inactive) when the BT device 104 becomes active. In one example embodiment, the WLAN controller 116 issues the HW WLAN off signal 132 as a HW complement to a software based flow control.

Further, the WLAN device 106 provides a high priority (HP) indicator 136 to a high priority handler 134 of the WLAN controller 116. The high priority handler 134 performs critical tasks (e.g., high priority tasks of the WLAN device 106) if any, and limits medium preemption by the BT device 104. In this case, the WLAN device 106 acts as a master device and the BT device 104 acts as a slave device. The high priority handler 134 issues a BT radio off signal 138 to the BT controller 114. As a result, the BT device 104 becomes inactive and the WLAN device becomes active to perform the critical tasks.

The flow control module 124 also determines a pending frame size 126 and a current physical layer (PHY) rate 128 (e.g., transmitting speed) of the data flow associated with the WLAN device 106. For example, initially, the BT device 104 uses ⅙th of the available medium time and the WLAN device 106 uses rest of the available medium time. In this case, the high priority handler 134 is inactive.

If the BT device 104 uses 100% of the available medium time, and a WLAN activity is to be performed, there is a chance of losing the WLAN activity (i.e., the WLAN activity is going to die). In this case, to protect the WLAN activity, the high priority handler 134 issues a high priority (HP) indicator 136 to the WLAN controller 116 which forwards the BT radio off signal 138 to the BT device 104. As a result, the BT device 104 becomes inactive during the period in which the WLAN activity is performed.

As a consequence, the flow control module 124 suppresses the interference between BT and WLAN co-localized entities while allowing a clean sharing of the radio medium. The flow control module 124 allows simultaneous BT and WLAN service at the cost of reducing the throughput in both systems, proportional to the respectively allocated fractions of time.

Figure 2:
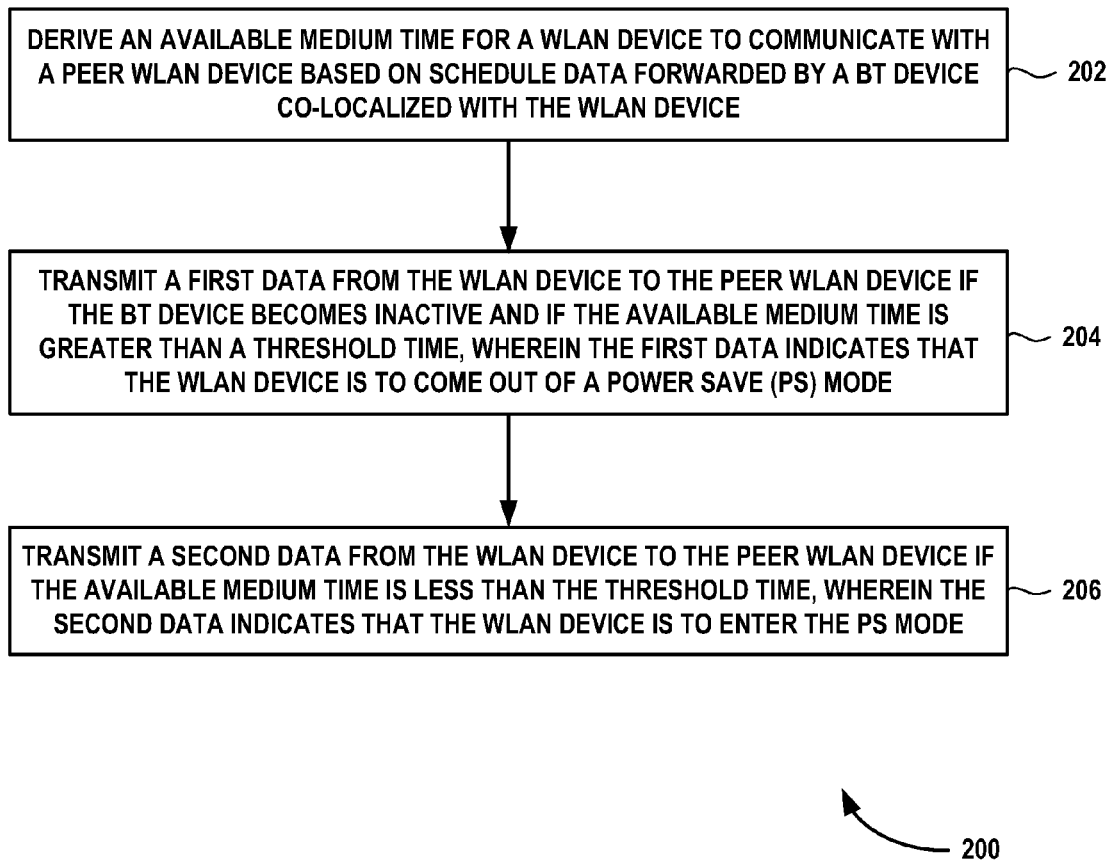
FIG. 2 is a process flow chart of an exemplary method for controlling data flow between a WLAN device co-localized with a BT device and its peer WLAN device based on power save mechanism of the WLAN devices, according to one embodiment.

FIG. 2 is a process flow chart 200 of an exemplary method for controlling data flow between a WLAN device (e.g., the WLAN device 106 of FIG. 1) co-localized with a BT device (e.g., the BT device 104 of FIG. 1) and its peer WLAN device (e.g., the peer WLAN device 112 of FIG. 1) based on power save mechanism of the WLAN devices, according to one embodiment. In step 202, an available medium time for the WLAN device 106 to communicate with the peer WLAN device 112 is derived based on schedule data (e.g., the schedule data 118 as illustrated in FIG. 1) forwarded by the BT device 104. It is appreciated that, the available medium time is a start time of a next active period of the BT device 104 minus a current time. Further, the available medium time is derived based on an activity indicator (e.g., the activity indicator 120 as illustrated in FIG. 1) forwarded by the BT device 104.

In step 204, a first data is transmitted from the WLAN device 106 to the peer WLAN device 112 if the BT device 104 becomes inactive and if the available medium time is greater than a threshold time. It is appreciated that, the first data indicates that the WLAN device 106 is to come out of a power save (PS) mode. In one example embodiment, the threshold time is equivalent to (2+0.5*buffer size of the peer WLAN device 112) multiplied by $T_1$ (i.e., time necessary to successfully transmit and receive a highest data packet size at current communication rate between the WLAN device 106 and the peer WLAN device 112) and further added by $T_2$ (i.e., time necessary to transmit the null frame and receive an acknowledgement signal at the current communication rate). Therefore, threshold time=(2+0.5*buffer size of the peer WLAN device 112)*$T_1$+$T_2$.

In one embodiment, transmitting the first data to the peer WLAN device 112 causes the peer WLAN device 112 to resume a communication with the WLAN device 106. In one example embodiment, the peer WLAN device 112 resumes the communication with the WLAN device 106 only if the first data is acknowledged by the peer WLAN device 112.

In step 206, a second data is transmitted from the WLAN device 106 to the peer WLAN device 112 if the available medium time is less than the threshold time. It is appreciated that, the second data indicates that the WLAN device 106 is to enter the PS mode. In one embodiment, transmitting the second data to the peer WLAN device 112 causes the peer WLAN device 112 to stop transmitting data to the WLAN device 106. In one example embodiment, the peer WLAN device 112 stops transmitting data to the WLAN device 106 if the second data is acknowledged by the peer WLAN device 112. The power saving mechanism for controlling the data flow of the WLAN device 106 co-localized with the BT device 104 is explained using the state diagram 300 as shown in FIG. 3.

Figure 3:
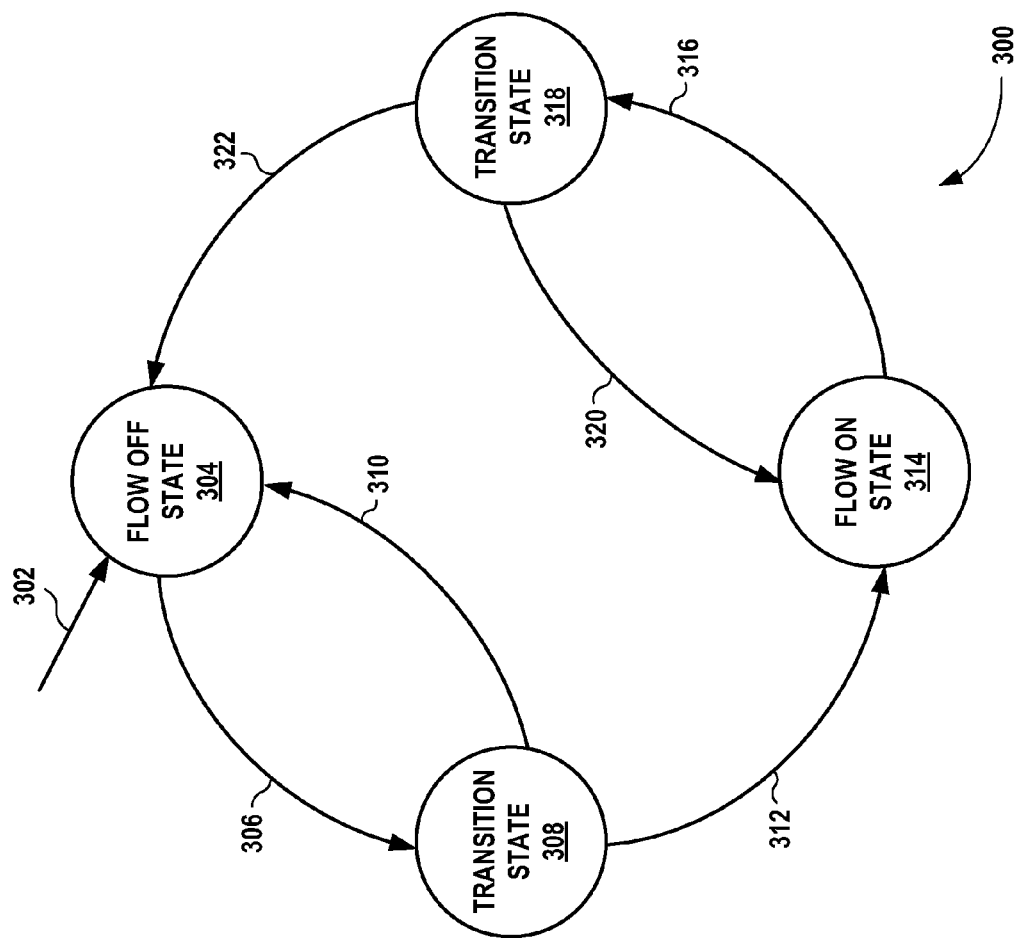
FIG. 3 is a state diagram of the exemplary method illustrated in FIG. 2, according to one embodiment.

FIG. 3 is a state diagram 300 of the exemplary method illustrated in FIG. 2, according to one embodiment. In step 302, a flow control mechanism starts its operation. It is appreciated that the flow control mechanism is an exemplary embodiment of the flow control method of FIG. 2. In step 304, the WLAN device 106 is in a flow off state (i.e., power saving (PS) mode) and the flow control mechanism derives the available medium time ($T_{AV}$) for the WLAN device 106 to communicate with a peer WLAN device 112 based on the schedule data 118 forwarded by the BT device 104.

In step 306, if the $T_{AV}$ is greater than the threshold time, the first data is transmitted from WLAN device 106 to the peer WLAN device 112. In one example embodiment, the first data includes a null frame with the PS mode=0. In one embodiment, the first data transmitted to the peer WLAN device 112 causes the peer WLAN device 112 to resume a communication with the WLAN device 106. In step 306, if $T_{AV}$ is less than the threshold time, the WLAN device 106 remains in power saving mode until the BT device 104 becomes inactive.

As explained above, the threshold time is equivalent to (2+0.5*buffer size of the peer WLAN device 112) multiplied by time necessary to successfully transmit and receive a highest data packet size at current communication rate between the WLAN device 106 and the peer WLAN device 112 and further added by time necessary to transmit the null frame and receive an acknowledgement signal at the current communication rate.

In step 308, the WLAN device 106 is in transition state until it is determined whether the first data is acknowledged by the peer WLAN device 112 or not. In step 310, if the first data is not acknowledged by the peer WLAN device 112, the flow control mechanism goes to flow off state 304 in which, the WLAN device 106 is in power saving mode. In step 312, if the first data is acknowledged by the peer WLAN device 112, the WLAN device comes out of the power saving mode and resumes a communication with the peer WLAN device 112.

In step 314, the WLAN device 106 is in flow on state (i.e., the WLAN device 106 is out of power saving mode) and the flow control mechanism derives a next available medium time ($T_{AV}$). The peer WLAN device 112 communicates with the WLAN device 106 until the $T_{AV}$ becomes less than the threshold time. In step 316, if the available medium time is less than the threshold time, a second data is transmitted from the WLAN device 106 to peer WLAN device 112. The second data transmitted to the peer WLAN device 112 causes the peer WLAN device 112 to stop transmitting data to the WLAN device 106. In one example embodiment, the second data includes a null frame with the PS mode=1.

In step 318, the WLAN device 106 is in transition state until it is determined whether the second data is acknowledged by the peer WLAN device 112 or not. In step 320, if the second data is not acknowledged by the peer WLAN device 112, the flow control mechanism goes to the flow on state 314 (e.g., as illustrated in FIG. 3), in which the WLAN device 106 is out of the power saving mode.

In step 322, if the second data is acknowledged by the peer WLAN device 112, the WLAN device 106 enters into the power saving mode and the peer WLAN device 112 stops transmitting data to the WLAN device 106. In one example embodiment, the peer WLAN device 112 flushes remaining frames (if any) addressed to the co-localized WLAN device 106 from its hardware (HW) buffers and stops sending frames to the WLAN device 106. Therefore, the traffic between the peer WLAN device 112 and the WLAN device 106 is not impacted. Hence, BT traffic is fully protected and the WLAN activities are protected during re-transmission failures and undue physical (PHY) rate decrease.

Figure 4:
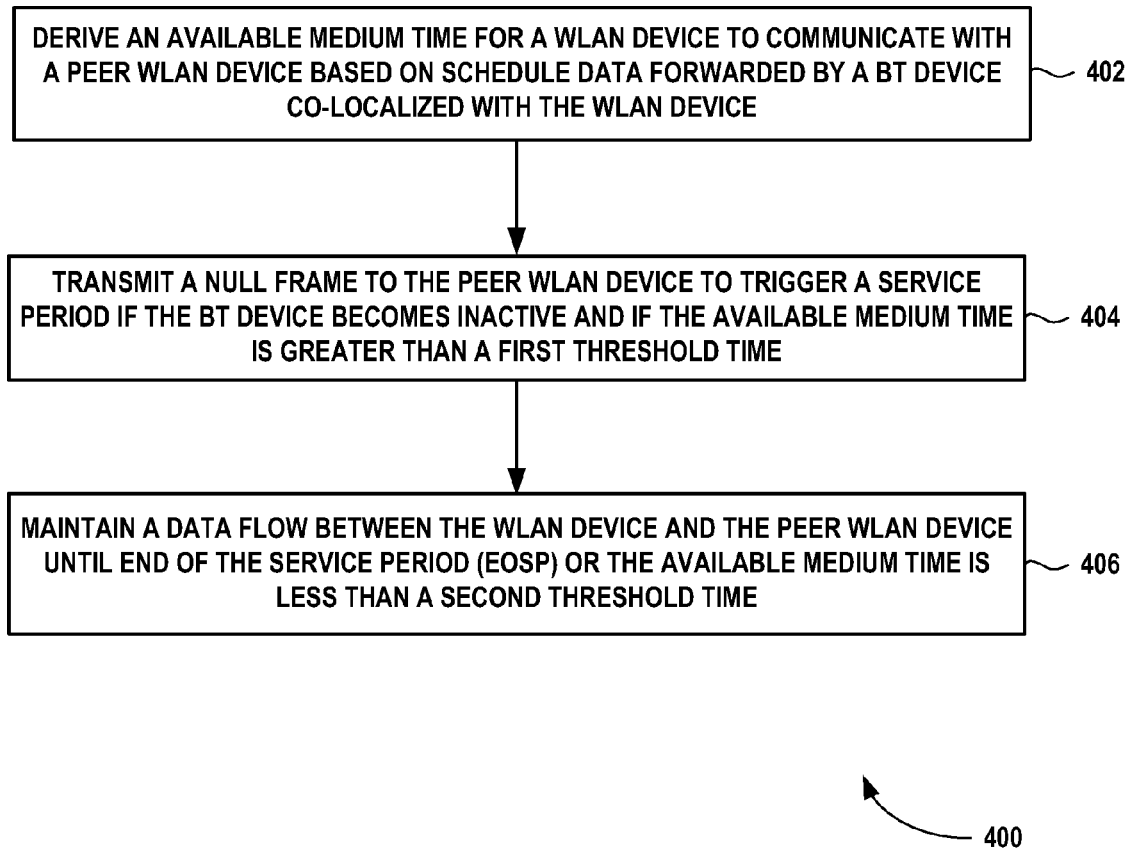
FIG. 4 is a process flow chart of an exemplary method for controlling data flow between a WLAN device co-localized with a BT device and its peer WLAN device based on unscheduled automatic power save delivery (UAPSD) mechanism of the WLAN devices, according to one embodiment.

FIG. 4 is a process flow chart 400 of an exemplary method for controlling a data flow between a WLAN device (e.g., the WLAN device 106 of FIG. 1) co-localized with a BT device (e.g., the BT device 104 of FIG. 1) and its peer WLAN device (e.g., the peer WLAN device 112 of FIG. 1) based on unscheduled automatic power save (UAPSD) mechanism of the WLAN devices, according to one embodiment.

In step 402, an available medium time ($T_{AV}$) for the WLAN device 106 to communicate with the peer WLAN device 112 is derived based on schedule data (e.g., the schedule data 118 as illustrated in FIG. 1) forwarded by the BT device 104 co-localized with the WLAN device 106. Further, the $T_{AV}$ is derived based on an activity indicator (e.g., the activity indicator 120 as illustrated in FIG. 1) of the BT device 104.

In step 404, a null frame is transmitted to the peer WLAN device 112 to trigger a service period if the BT device 104 becomes inactive and if the $T_{AV}$ is greater than a first threshold time. In one example embodiment, the first threshold time is equivalent to time necessary for the WLAN device 106 to transmit the null frame and receive an acknowledgement signal from the peer WLAN device 112 plus time for the WLAN device 106 to receive frames from the peer WLAN device 112 and transmit an acknowledgement signal to the peer WLAN device 112.

In step 406, a data flow between the WLAN device 106 and the peer WLAN device 112 is maintained until end of the service period (EOSP) or the available medium time ($T_{AV}$) is less than a second threshold time. In one exemplary implementation, the act of maintaining the data flow is performed only if the null frame is acknowledged by the peer WLAN device 112. In one example embodiment, the second threshold time is equivalent to the first threshold time minus time elapsed since start of the service period. The UAPSD mechanism for controlling the data flow of the WLAN device 106 co-localized with the BT device 104 is explained using the state diagram 500 as shown in FIG. 5.

Figure 5:
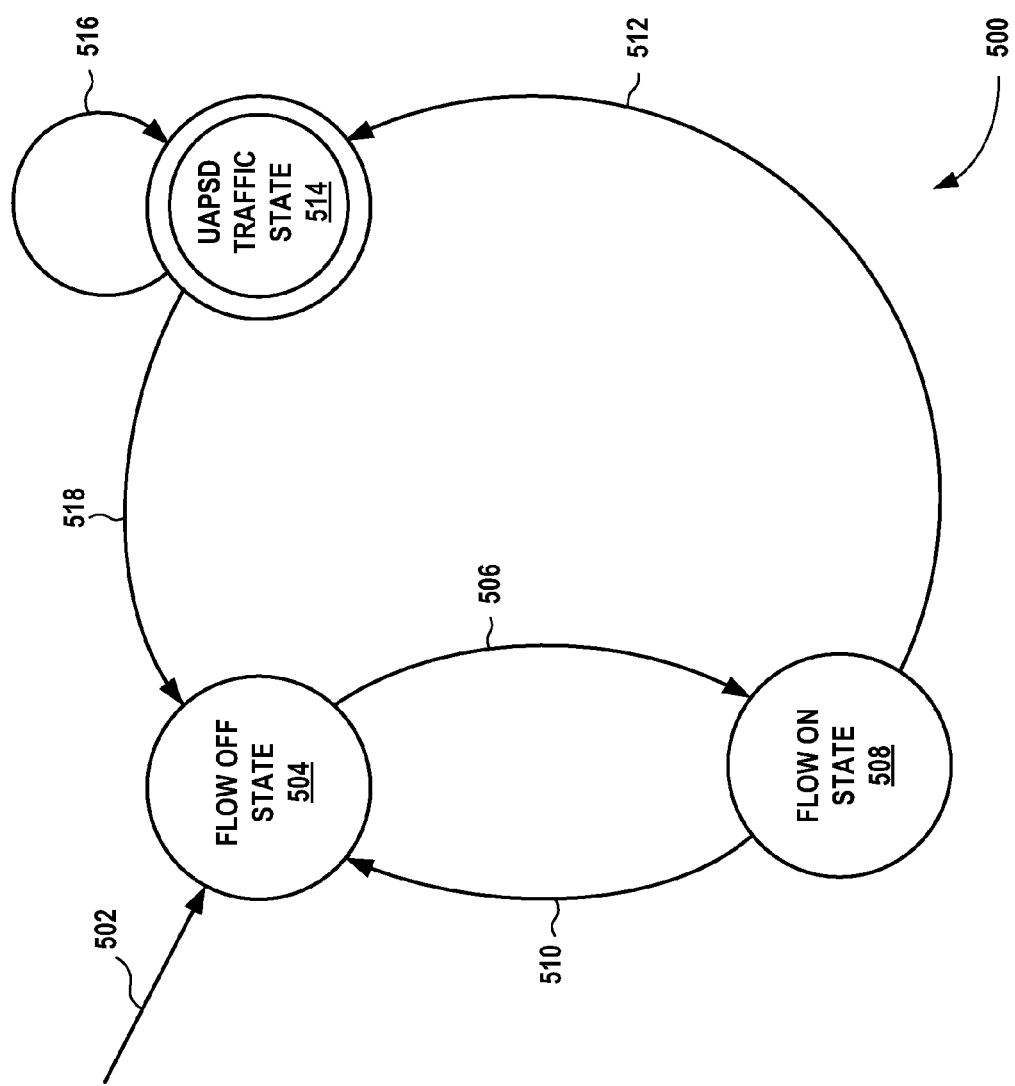
FIG. 5 is a state diagram of the exemplary method illustrated in FIG. 4, according to one embodiment.

FIG. 5 is a state diagram 500 of the exemplary method illustrated in FIG. 4, according to one embodiment. In step 502, a flow control mechanism starts its operation. It is appreciated that the flow control mechanism is an exemplary embodiment of the flow control method of FIG. 4. In step 504, the WLAN device 106 is in flow off state (i.e., the WLAN device 106 is inactive) and the flow control mechanism derives the available medium time ($T_{AV}$) for the WLAN device 106 to communicate with the peer WLAN device 112 based on the schedule data 118 forwarded by the BT device 104.

In step 506, if the $T_{AV}$ is greater than the first threshold time and if the BT device 104 becomes inactive, the null frame is transmitted to the peer WLAN device 112 to trigger the service period and resets time elapsed since start of the service period. The first threshold time is equivalent to time necessary for the WLAN device 106 to transmit the null frame and receive an acknowledgement signal from the peer WLAN device 112 plus time for the WLAN device 106 to receive frames from the peer WLAN device 112 and transmit an acknowledgement signal to the peer WLAN device 112. In one example embodiment, the service period includes frames exchanged between WLAN devices. If the $T_{AV}$ is less than the first threshold time, the WLAN device 106 remains in flow off state.

In step 508, the WLAN device 106 is in flow on state which indicates that WLAN device 106 is active and the BT device 104 is inactive. In step 510, if the null frame is not acknowledged by the peer WLAN device 112, the flow control mechanism goes to flow off state at which, the WLAN device 106 is inactive. In step 512, if the null frame is acknowledged by the peer WLAN device 112, the flow control mechanism goes to step 514. In step 514, the data flow is maintained between the WLAN device 106 and the peer WLAN device 112.

In step 516, the act of maintaining the data flow between the WLAN device 106 and the peer WLAN device 112 until the end of the service period or the available medium time ($T_{AV}$) is less than a second threshold time. In one example embodiment, the second threshold time is equivalent to the first threshold time minus time elapsed since start of the service period. In step 518, if the $T_{AV}$ is less than the second threshold time, the flow control mechanism goes to the flow off state 504. Hence, BT traffic is fully protected and the WLAN activities are protected during re-transmission failures and undue PHY rate decrease.

Figure 6:
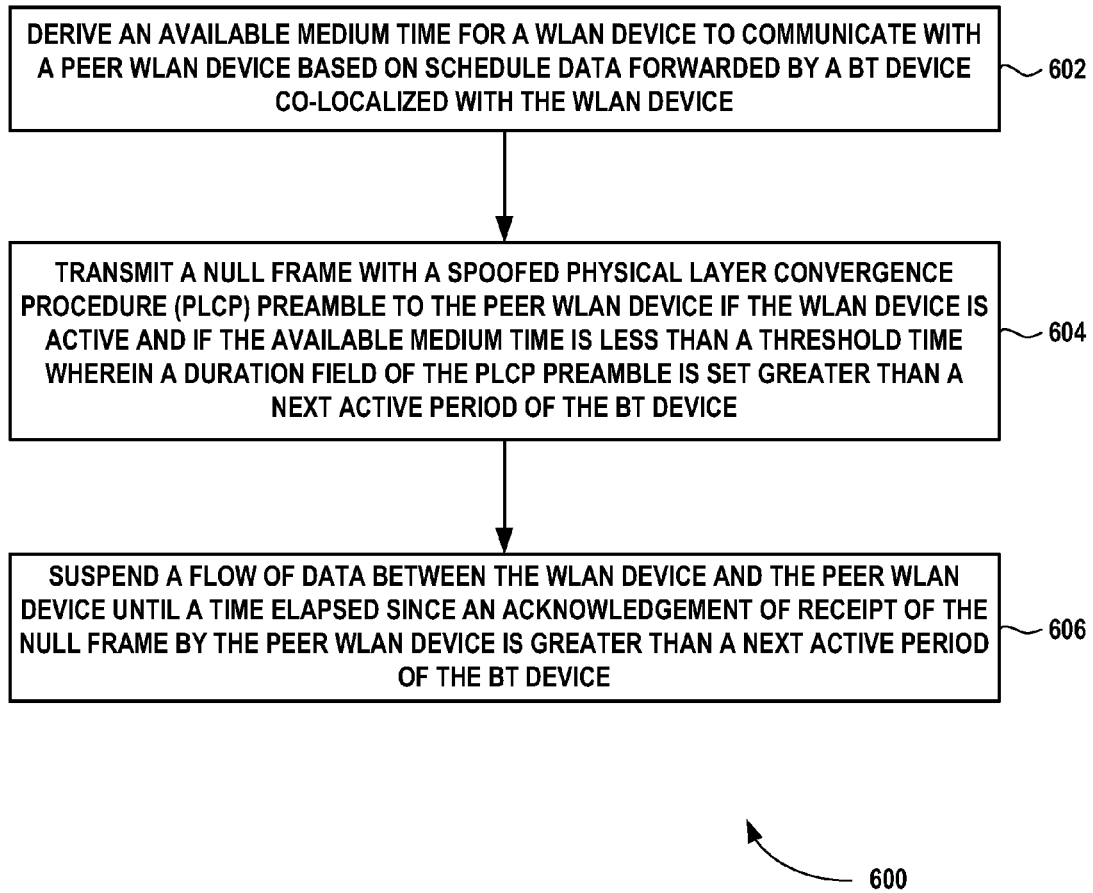
FIG. 6 is a process flow chart of an exemplary method for controlling data flow between a WLAN device co-localized with a BT device and its peer WLAN device by spoofing duration information available in a physical layer convergence procedure (PLCP) preamble associated with the WLAN devices, according to one embodiment.

FIG. 6 is a process flow chart 600 of an exemplary method for controlling a data flow between a WLAN device (e.g., the WLAN device 106 of FIG. 1) co-localized with a BT device (e.g., the BT device 104 of FIG. 1) and its peer WLAN device (e.g., the peer WLAN device 112 of FIG. 1) by spoofing duration information available in a physical layer convergence procedure (PLCP) preamble associated with the WLAN devices, according to one embodiment. In step 602, an available medium time ($T_{AV}$) for the WLAN device 106 to communicate with a peer WLAN device 112 is derived based on schedule data (e.g., the schedule data 118 as illustrated in FIG. 1) forwarded by the BT device 104. Further, the $T_{AV}$ is derived based on an activity indicator (e.g., the activity indicator 120 as illustrated in FIG. 1) of the BT device 104.

In step 604, a null frame with a spoofed physical layer convergence protocol (PLCP) preamble is transmitted to the peer WLAN device 112 if the WLAN device 106 is active and if the $T_{AV}$ is less than a threshold time. In one embodiment, transmitting the null frame with the PLCP preamble causes the peer WLAN device 112 to set a network allocation vector (NAV) to a value set in the duration field of the PLCP preamble and stop the flow of data until end of a protected period associated with the NAV. In one example embodiment, the threshold time is equivalent to time necessary for the WLAN device 106 to transmit the null frame to the peer WLAN device 112 and receive the acknowledgement signal from the peer WLAN device 112 multiplied by two.

In one embodiment, a duration field of the PLCP preamble is set greater than a next active period of the BT device 104. In one example embodiment, the duration field of the PLCP preamble covers whole BT activity periods just before the next active period of the BT device 104. In step 606, a flow of data between the WLAN device 106 and the peer WLAN device 112 is suspended until a time elapsed since an acknowledgement of receipt of the null frame by the peer WLAN device 112 is greater than a next active period of the BT device 104. The spoofed PLCP preamble based flow control for controlling the data flow of the WLAN device 106 co-localized with the BT device 104 is explained using the state diagram 700 as shown in FIG. 7.

Figure 7:
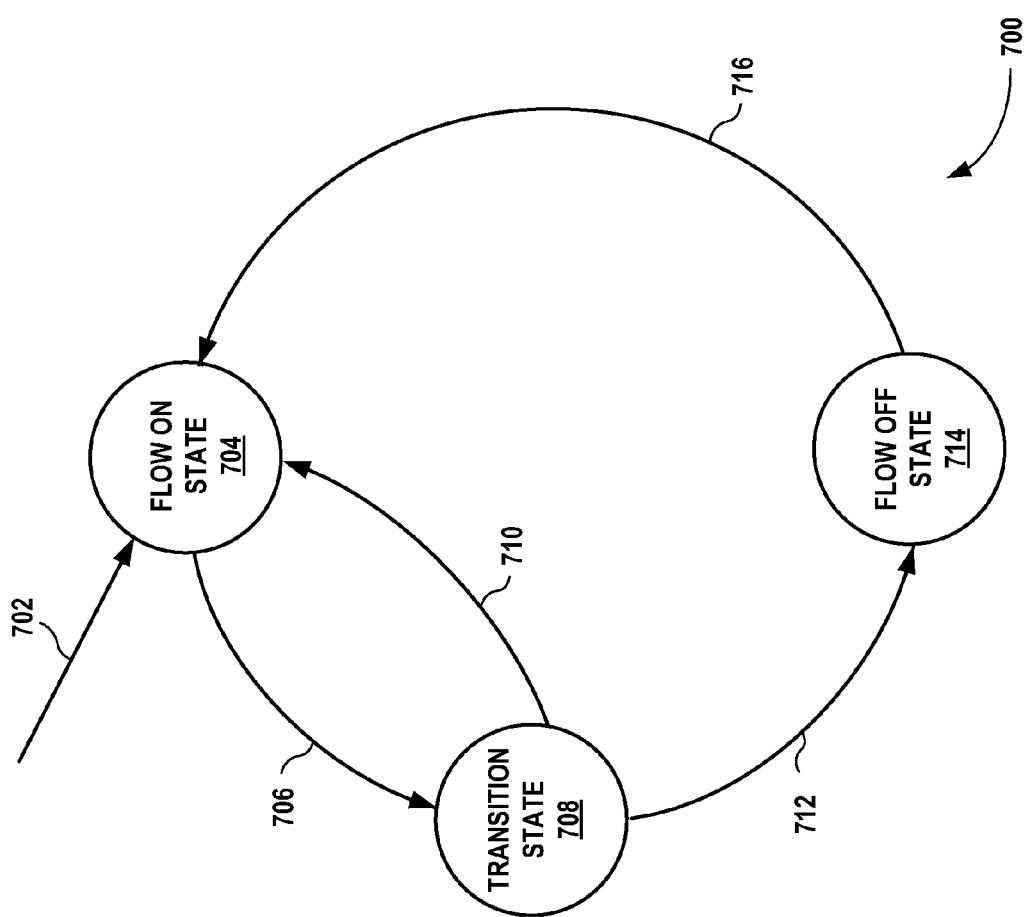
FIG. 7 is a state diagram of the exemplary method illustrated in FIG. 6, according to one embodiment.

FIG. 7 is a state diagram of the exemplary method illustrated in FIG. 6, according to one embodiment. In step 702, a flow control mechanism starts its operation. It is appreciated that the flow control mechanism is an exemplary embodiment of the flow control method of FIG. 6. In step 704, the WLAN device 106 is in flow on state and the flow control mechanism derives the $T_{AV}$ for the WLAN device to communicate with the peer WLAN device 112 based on the schedule data 118 forwarded by the BT device 104.

In step 706, if the $T_{AV}$ is less than a threshold time and if the WLAN device 106 is active, a null frame with a spoofed PLCP preamble is transmitted to the peer WLAN device 112. In one exemplary implementation, transmitting the null frame with the PLCP preamble causes the peer WLAN device 106 to set a NAV to a value, set in the duration field of the PLCP preamble and to stop the flow of data until end of a protected period associated with the NAV.

In one example embodiment, the threshold time is equivalent to time necessary for the WLAN device 106 to transmit the null frame to the peer WLAN device 112 and receive the acknowledgement signal from the peer WLAN device 112 multiplied by two. In step 708, the WLAN device 106 is in a transition state until the flow control mechanism determines whether the null frame is acknowledged by the peer WLAN device 112 or not. In step 710, if the null frame is not acknowledged by the peer WLAN device 112, the flow control mechanism goes to the flow on state 704. In step 712, if the null frame is acknowledged by the peer WLAN device 112, the flow control mechanism resets $T_1$ (i.e., time elapsed since data flow is stopped) and goes to flow off state 714.

In step 716, the flow of data is suspended between the WLAN device 106 and the peer WLAN device 112 until a time elapsed since an acknowledgement of receipt of the null frame by the peer WLAN device 112 is greater than a next active period of the BT device 104. Hence, BT traffic is fully protected and the WLAN activities are protected during re-transmission failures and undue PHY rate decrease.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry).

What is claimed is:

1. A method for controlling data flow of co-localized a wireless local area network (WLAN) device and a bluetooth (BT) device, comprising:
    deriving an available medium time for the WLAN device to communicate with a peer WLAN device based on schedule data forwarded by the BT device;
    transmitting a first data from the WLAN device to the peer WLAN device if the BT device becomes inactive and if the available medium time is greater than a threshold time, wherein the first data indicates that the WLAN device is to come out of a power save (PS) mode, wherein the threshold time is equivalent to (2+0.5*buffer size of the peer WLAN device) multiplied by time necessary to successfully transmit and receive a highest data packet size at current communication rate between the WLAN device and the peer WLAN device and further added by time necessary to transmit a null frame and receive an acknowledgement signal at the current communication rate; and transmitting a second data from the WLAN device to the peer WLAN device if the available medium time is less than the threshold time, wherein the second data indicates that the WLAN device is to enter the PS mode.

2. The method of claim 1, wherein the WLAN device and the BT device are co-localized in a station, and wherein the data flow of the WLAN device and the BT device is controlled by a controller of the station.

3. The method of claim 1, wherein the first data to the peer WLAN device causes the peer WLAN device to resume a communication with the WLAN device.

4. The method of claim 1, wherein the second data to the peer WLAN device causes the peer WLAN device to stop transmitting data to the WLAN device.

5. The method of claim 1, wherein the peer WLAN device resumes a communication with the WLAN device if the first data is acknowledged by the peer WLAN device, and wherein the peer WLAN device stops transmitting data to the WLAN device if the second data is acknowledged by the peer WLAN device.

6. The method of claim 1, wherein the first data comprises a null frame with the PS mode =0, and wherein the second data comprises a null frame with the PS mode =1.

7. The method of claim 1, wherein the available medium time is a start time of a next active period of the BT device minus a current time.

8. The method of claim 1, wherein the available medium time is further based on an activity indicator forwarded by the BT device, wherein the activity indicator indicates a status of a current BT activity.

9. A non-transitory machine-readable medium embodying a set of instructions that, when executed by a machine, causes the machine to perform a method for controlling data flow of co-localized a wireless local area network (WLAN) device and a bluetooth (BT) device, the method comprising:

deriving an available medium time for the WLAN device to communicate with a peer WLAN device based on schedule data forwarded by the BT device;

transmitting a first data from the WLAN device to the peer WLAN device if the BT device becomes inactive and if the available medium time is greater than a threshold time, wherein the first data indicates that the WLAN device is to come out of a power save (PS) mode, and wherein the threshold time is equivalent to (2+0.5*buffer size of the peer WLAN device) multiplied by time necessary to successfully transmit and receive a highest data packet size at current communication rate between the WLAN device and the peer WLAN device and further added by time necessary to transmit a null frame and receive an acknowledgement signal at the current communication rate; and transmitting a second data from the WLAN device to the peer WLAN device if the available medium time is less than the threshold time, wherein the second data indicates that the WLAN device is to enter the PS mode.

10. A method for controlling data flow of co-localized a WLAN device and a Bluetooth (BT) device, comprising:

deriving an available medium time for the WLAN device to communicate with a peer WLAN device based on schedule data and an activity indicator forwarded by the BT device, wherein the available medium time is a start time of a next active period of the BT device minus a current time, wherein the schedule data comprises information associated with a next BT activity, wherein the activity indicator indicates a status of a current BT activity, and wherein the WLAN device receives a flow control signal based on the activity indicator to stop communicating with the peer WLAN device when the BT device becomes active;

transmitting a null frame to the peer WLAN device to trigger a service period if the BT device becomes inactive and if the available medium time is greater than a first threshold time, wherein the first threshold time is equivalent to time necessary for the WLAN device to transmit the null frame and receive an acknowledgement signal from the peer WLAN device plus time for the WLAN device to receive frames from the peer WLAN device and transmit an acknowledgement signal to the peer WLAN device; and maintaining a data flow between the WLAN device and the peer WLAN device until the available medium time is less than a second threshold time, wherein the second threshold time is equivalent to the first threshold time minus time elapsed since start of the service period.

11. The method of claim 10, wherein the maintaining the data flow is performed only if the null frame is acknowledged by the peer WLAN device.

12. A method for controlling data flow of co-localized a WLAN device and a Bluetooth device, comprising:

deriving an available medium time for the WLAN device to communicate with a peer WLAN device based on schedule data forwarded by the BT device;

transmitting a null frame with a spoofed physical layer convergence procedure (PLCP) preamble to the peer WLAN device if the WLAN device is active and if the available medium time is less than a threshold time, wherein a duration field of the PLCP preamble is set greater than a next active period of the BT device, and wherein the threshold time is equivalent to time necessary for the WLAN device to transmit the null frame to the peer WLAN device and receive an acknowledgement of receipt of the null frame by the peer WLAN device multiplied by two; and suspending a flow of data between the WLAN device and the peer WLAN device until a time elapsed since an acknowledgement of receipt of the null frame by the peer WLAN device is greater than a next active period of the BT device.

13. The method of claim 12, wherein the duration field of the PLCP preamble covers whole BT activity periods just before the next active period of the BT device.

14. The method of claim 12, wherein the transmitting the null frame with the PLCP preamble causes the peer WLAN device to set a network allocation vector (NAV) to a value set in the duration field of the PLCP preamble and stop the flow of data until end of a protected period associated with the NAV.

15. The method of claim 12, wherein the deriving the available medium time is further based on an activity indicator of the BT device, wherein the activity indicator indicates a status of a current BT activity.

16. A method for controlling data flow of co-localized a wireless local area network (WLAN) device and a bluetooth (BT) device, comprising:

deriving an available medium time for the WLAN device to communicate with a peer WLAN device based on schedule data forwarded by the BT device, wherein the available medium time is a start time of a next active period of the BT device minus a current time, and wherein the schedule data comprises information associated with a next BT activity;

transmitting a first data from the WLAN device to the peer WLAN device if the BT device becomes inactive and if the available medium time is greater than a threshold time, wherein the first data indicates that the WLAN device is to come out of a power save (PS) mode, and wherein the threshold time is equivalent to (2+0.5*buffer size of the peer WLAN device) multiplied by time necessary to successfully transmit and receive a highest data packet size at current communication rate between the WLAN device and the peer WLAN device and further added by time necessary to transmit a null frame and receive an acknowledgement signal at the current communication rate; and transmitting a second data from the WLAN device to the peer WLAN device if the available medium time is less than the threshold time, wherein the second data indicates that the WLAN device is to enter the PS mode.

17. A method for controlling data flow of co-localized a WLAN device and a Bluetooth device, comprising:

deriving an available medium time for the WLAN device to communicate with a peer WLAN device based on schedule data forwarded by the BT device, wherein the available medium time is a start time of a next active period of the BT device minus a current time, and wherein the schedule data comprises information associated with a next BT activity;

transmitting a null frame with a spoofed physical layer convergence procedure (PLCP) preamble to the peer WLAN device if the WLAN device is active and if the available medium time is less than a threshold time, wherein a duration field of the PLCP preamble is set greater than a next active period of the BT device, and wherein the threshold time is equivalent to time necessary for the WLAN device to transmit the null frame to the peer WLAN device and receive an acknowledgement of receipt of the null frame by the peer WLAN device multiplied by two; and suspending a flow of data between the WLAN device and the peer WLAN device until a time elapsed since the acknowledgement of receipt of the null frame by the peer WLAN device is greater than a next active period of the BT device.

* * * * *